(12) United States Patent
Miyazaki

(10) Patent No.: US 6,796,728 B2
(45) Date of Patent: Sep. 28, 2004

(54) FOCAL PLANE SHUTTER

(75) Inventor: Hiroshi Miyazaki, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/655,125

(22) Filed: Sep. 5, 2003

(65) Prior Publication Data
US 2004/0047626 A1 Mar. 11, 2004

(30) Foreign Application Priority Data
Sep. 10, 2002 (JP) ........................................ 2002-263520

(51) Int. Cl.⁷ .............................................. G03B 9/08
(52) U.S. Cl. ..................................... 396/463; 396/489
(58) Field of Search ................................ 396/463, 489, 396/508

(56) References Cited

U.S. PATENT DOCUMENTS

| | | | |
|---|---|---|---|
| 4,417,797 A | * 11/1983 | Senuma ...................... 396/469 |
| 5,264,896 A | 11/1993 | Lee et al. |
| 5,333,025 A | 7/1994 | Dowe |
| 5,749,014 A | * 5/1998 | Shimada ..................... 396/489 |
| 5,809,357 A | * 9/1998 | Hamasaki ................... 396/449 |
| 6,000,860 A | 12/1999 | Krueger |
| 2003/0012573 A1 | 1/2003 | Sekizawa et al. |

FOREIGN PATENT DOCUMENTS

| | | |
|---|---|---|
| JP | 8-190123 | 7/1996 |
| WO | 02/43227 | 5/2002 |

* cited by examiner

Primary Examiner—David M. Gray
(74) Attorney, Agent, or Firm—Wenderoth, Lind & Ponack L.L.P.

(57) ABSTRACT

A focal plane shutter includes a base plate having an aperture; an electromagnetic actuator including a rotor rotatably supported on the base plate and having a magnetized part and an output part, a yoke disposed around the rotor, and a magnetizing coil wound onto the yoke; a blade pivotably supported on the base plate and connected to the output part, for opening and closing the aperture; and an angle adjusting mechanism. A relative mounting angle between at least two of the magnetized part, the yoke, and the output part is adjusted by the angle adjusting mechanism. Accordingly, variation in, for example, the magnetization angle can be corrected.

5 Claims, 10 Drawing Sheets

FOCAL PLANE SHUTTER

BACKGROUND OF THE INVENTION

1. Field of the Invention

This invention relates to a focal plane shutter that uses an electromagnetic actuator serving as a driving source and including a rotor that rotates within a predetermined angular range.

2. Description of the Related Art

A well-known conventional focal plane shutter includes an electromagnetic actuator, which is made up of a cylindrical magnetized rotor, a yoke disposed around the rotor, a coil wound onto the yoke, etc., leading and trailing blades for opening and closing an exposure aperture, a charge mechanism for charging a spring force by which the leading blade and the trailing blade are driven, and a latch mechanism for maintaining a charged state while latching a spring. The leading and trailing blades are moved to perform an exposure operation by allowing the electromagnetic actuator to release a latched state (see Japanese Unexamined Patent Publication No. Hei-8-190123).

Another well-known conventional focal plane shutter includes leading and trailing blades for opening and closing an exposure aperture, and an electromagnetic actuator, which is made up of a cylindrical magnetized rotor, a yoke disposed around the rotor, a coil wound onto the yoke, etc., in which the electromagnetic actuator is disposed to correspond to each of the leading and trailing blades so as to directly drive the leading blade and the trailing blade (see International Publication WO02/43227).

Moreover, in the focal plane shutter structured to drive the leading and trailing blades by the charge force of the spring, there has been a need to change the wire diameter, the number of windings, etc., of the spring generating a driving force in order to change the relationship between a rotation angle and a torque. There has also been a need to adjust the running characteristics of the leading blade and the trailing blade if a desired exposure operation is not obtained or unevenness in exposure occurs.

Likewise, in the focal plane shutter structured to directly drive the leading and trailing blades by the electromagnetic actuator, there has been a need to troublesomely prepare and re-attach a new rotor that has undergone a change in its magnetization angle if a desired exposure operation is not obtained or unevenness in exposure occurs because of variation in the magnetization angle of the rotor or for other reasons.

SUMMARY OF THE INVENTION

The present invention has been made in consideration of the problems of the conventional devices. It is therefore an object of the present invention to provide a focal plane shutter capable of obtaining a desired exposure characteristic merely by performing a simple adjustment without carrying out the job of exchanging or rearranging components.

The focal plane shutter of the present invention that achieves the object has a base plate that defines an exposure aperture; an electromagnetic actuator including a rotor rotatably supported on the base plate and having a magnetized part magnetized to different polarities and an output part from which a driving force is output outward, a yoke that is disposed around the rotor and forms a magnetic circuit, and a magnetizing coil wound on the yoke; a blade supported pivotably on the base plate and connected to the output part to open and close the exposure aperture; and an angle adjusting mechanism that can adjust at least two relative mounting angles of the yoke, the magnetized part, and the output part of the rotor around a rotational axis of the rotor.

According to this structure, variation in the magnetization angle can be corrected, and the mounting angle can be changed to be a desired angular position by allowing the angle adjusting mechanism to adjust at least two relative mounting angles of the yoke, the magnetized part, and the output part of the rotor, for example, when the magnetization angle (i.e., angular position of a boundary plane between N and S poles) of the rotor with the yoke or with the output part deviates from a predetermined position or when the magnetization angle is adjusted to be the desired angular position so as to change an exposure characteristic.

In the device constructed as above, the angle adjusting mechanism can have a holding plate that holds the yoke and an adjusting mechanism that can adjust the holding plate to be situated at a desired angular position around the rotational axis.

According to this structure, the mounting angle of the yoke with respect to the magnetization angle of the rotor can be corrected or changed by allowing the adjusting mechanism to turn the holding plate around the rotational axis of the rotor so as to be situated at a desired angular position.

In the device constructed as above, the angle adjusting mechanism can have an output part formed separately from the rotor and an adjusting mechanism that can adjust a relative angular position between the rotor and the output part.

According to this structure, the mounting angle of the magnetized part with respect to the output part of the rotor can be corrected or changed by allowing the adjusting mechanism to turn the output part around the rotational axis of the rotor so as to be situated at a desired angular position.

In the device constructed as above, the blade can include a leading blade that opens the aperture and a trailing blade that closes the aperture when an exposure operation is performed, and the electromagnetic actuator and the angle adjusting mechanism can be provided for each of the leading blade and the trailing blade.

According to this structure, an exposure operation stable in, for example, slit running can be obtained by respectively driving the leading and trailing blades by use of the electromagnetic actuator having the angle adjusting mechanism.

DETAILED DESCRIPTION OF THE PREFERRED EMBODIMENTS

Figure 1:
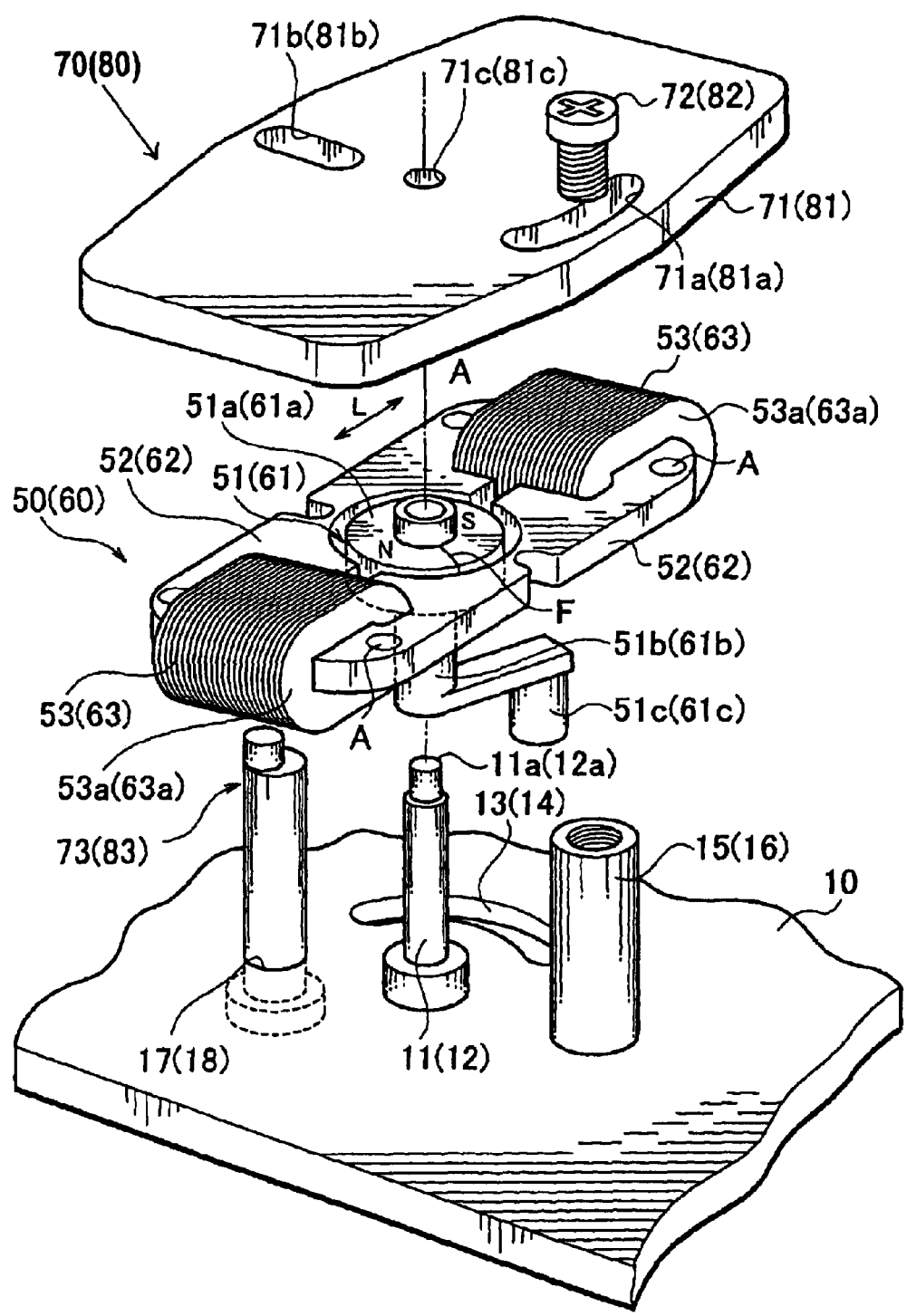
FIG. 1 shows an embodiment of a focal plane shutter according to the present invention, being an exploded perspective view of an electromagnetic actuator which is a constituent element of the focal plane shutter.

Embodiments of the present invention will be hereinafter described with reference to the accompanying drawings. FIG. 1 through FIG. 7 show an embodiment of a focal plane shutter according to the present invention.

As shown in FIG. 1, FIG. 3A, FIG. 3B, and FIG. 5, the focal plane shutter includes a main plate 10 and a back plate 20 each serving as a base plate that defines exposure apertures 10a and 20a, a leading blade 30 and a trailing blade 40 each serving as a blade supported pivotally on the main plate 10 so as to open and close the apertures 10a and 20a, an electromagnetic actuator 50 that is disposed at the lower left side of the aperture 10a and that directly drives the leading blade 30, an electromagnetic actuator 60 that is disposed at the upper left side of the aperture 10a in parallel with the electromagnetic actuator 50 and that directly drives the trailing blade 40, and angle adjusting mechanisms 70 and 80 that adjust the respective mounting angles of the electromagnetic actuators 50 and 60.

As shown in FIG. 1, FIG. 3A, FIG. 3B, FIG. 5, and FIG. 6, the main plate 10 includes supporting shafts 11 and 12 that rotatably support rotors 51 and 61 described later, circularly arcuate guide slots 13 and 14 through which driving pins 51c and 61c described later pass, screw portions 15 and 16 by which holding plates 71 and 81 (described later) are positioned and fastened, and supporting shafts 17a, 17b, 18a, and 18b that pivotably support the leading and trailing blades 30 and 40.

The back plate 20 is connected to the main plate 10 with a predetermined interval to the backface of the main plate 10 and defines a blade chamber W that rotatably contains the leading and trailing blades 30 and 40.

Figure 5:
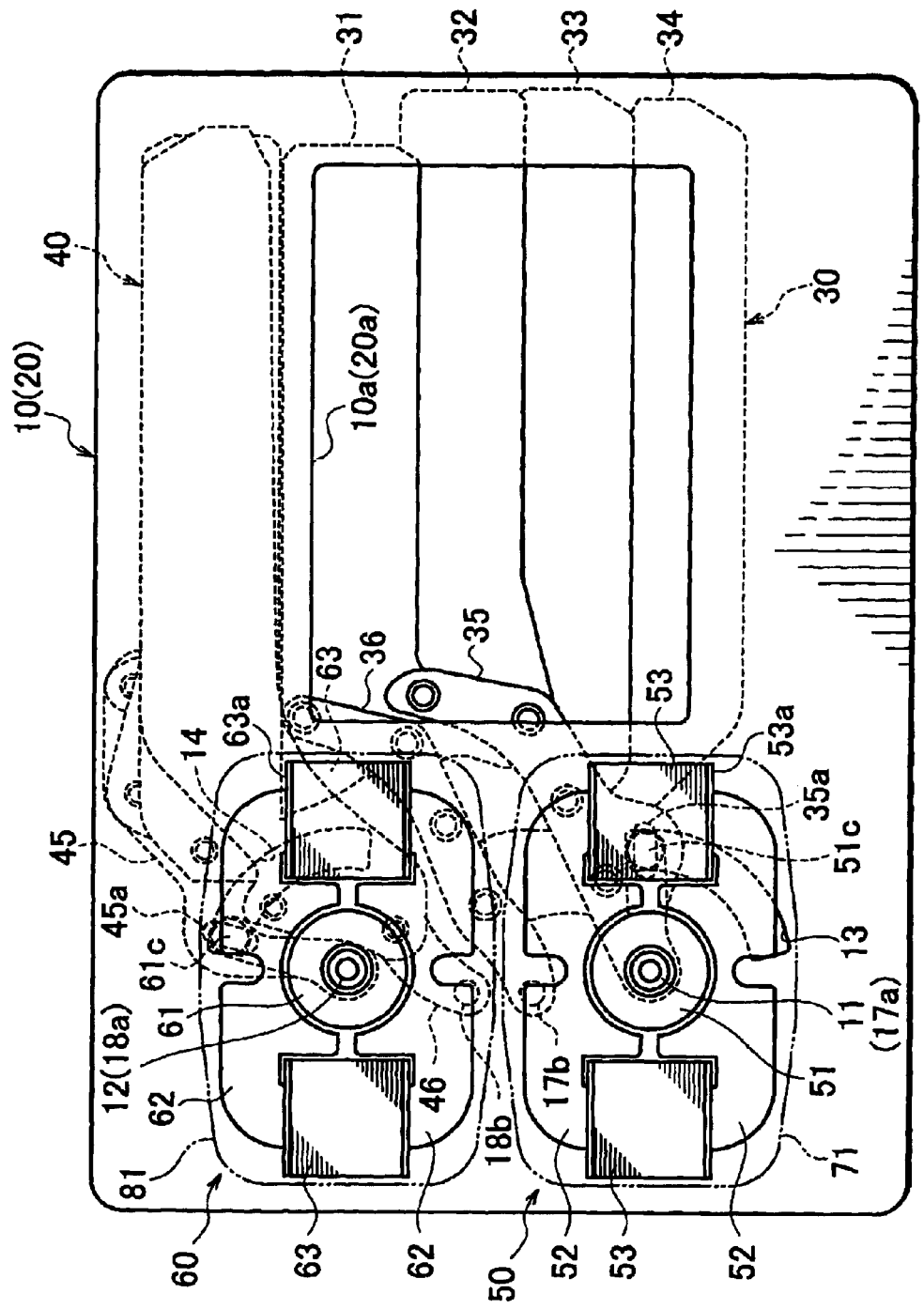
FIG. 5 is a plan view of the focal plane shutter in a state where a leading blade is at a closed position, whereas a trailing blade is at an open position.

As shown in FIG. 5, the leading blade 30 is made up of a plurality of (in this embodiment, four) blades 31, 32, 33, and 34, and a driving arm 35 and a supporting arm 36 that pivotably connect the blades 31 through 34 together. The driving arm 35 and the supporting arm 36 are pivotably supported by the supporting shafts 17a and 17b, respectively, which are provided on the backface of the main plate 10.

The driving pin 51c of the electromagnetic actuator 50 is connected to a long hole 35a of the driving arm 35. The driving arm 35 and the supporting arm 36 swing in response to the rotation of the rotor 51 within a predetermined angular range. The blades 31 through 34 substantially linearly reciprocate between a closed position where the aperture 10a is closed while they are unfolding as shown in FIG. 5, and an open position, where the aperture 10a is opened while the blades are lying on each other at the lower side as shown in FIG. 6.

Figure 6:
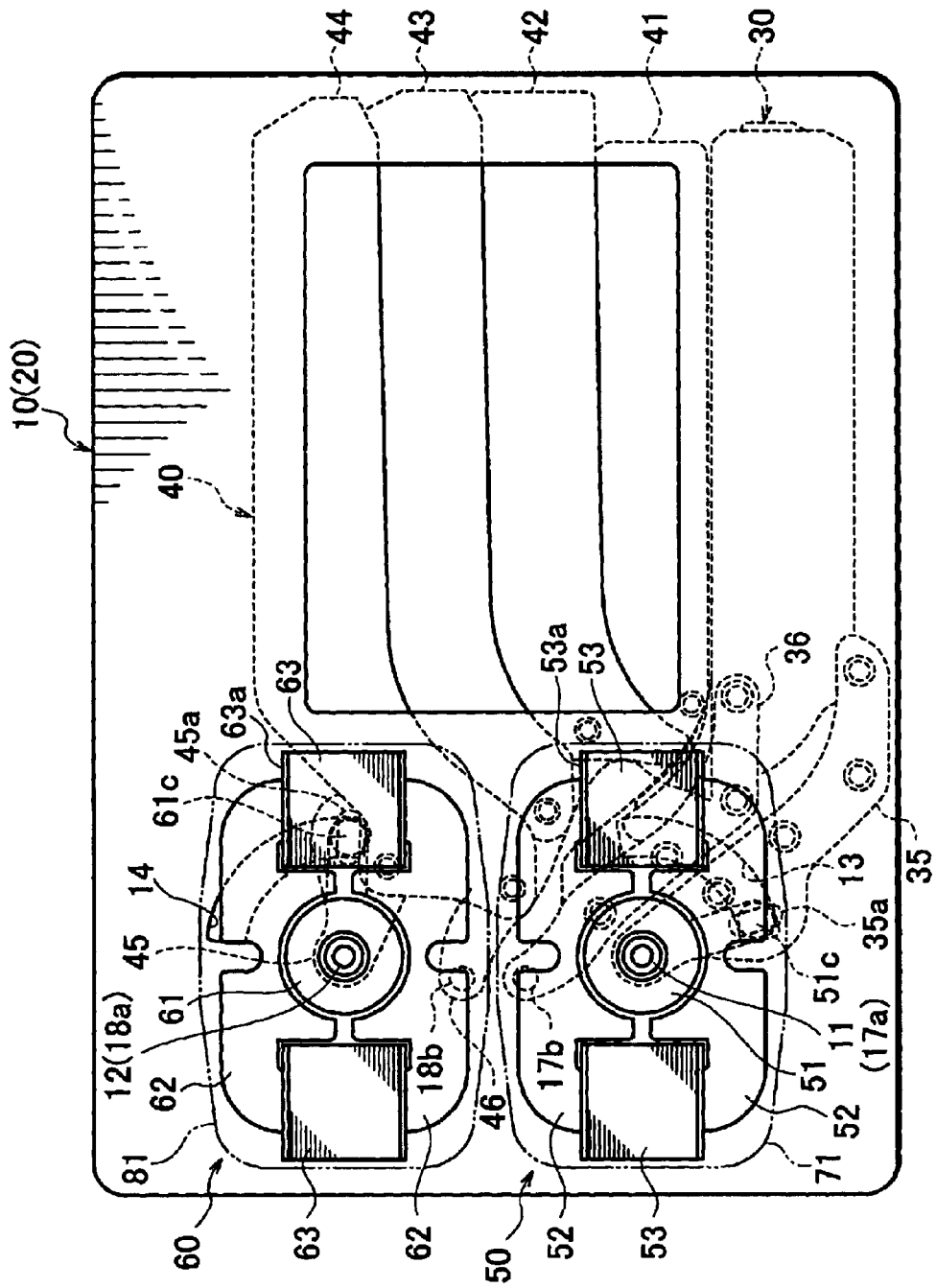
FIG. 6 is a plan view of the focal plane shutter in a state where the leading blade is at the open position, whereas the trailing blade is at the closed position.

As shown in FIG. 6, the trailing blade 40 is made up of a plurality of (in this embodiment, four) blades 41, 42, 43, and 44, and a driving arm 45 and a supporting arm 46 that pivotably connect the blades 41 through 44 together. The driving arm 45 and the supporting arm 46 are pivotably supported by the supporting shafts 18a and 18b, respectively, which are provided on the backface of the main plate 10.

The driving pin 61c of the electromagnetic actuator 60 is connected to a long hole 45a of the driving arm 45. The driving arm 45 and the supporting arm 46 swing in response to the rotation of the rotor 61 within a predetermined angular range. The blades 41 through 44 substantially linearly reciprocate between an open position, where the aperture 10a is opened while they are lying on each other at the upper side as shown in FIG. 5, and a closed position, where the aperture 10a is closed while they are unfolding as shown in FIG. 6.

As shown in FIG. 1, the electromagnetic actuator 50 (60) is made up of the rotor 51 (61) that is rotatably supported by the supporting shaft 11 (12) of the main plate 10 and that rotates within a predetermined angular range, a flat yoke 52 (62) that is disposed around the rotor 51 (61) and that forms a magnetic circuit, and two magnetizing coils 53 (63) wound onto the yoke 52 (62).

Figure 2:
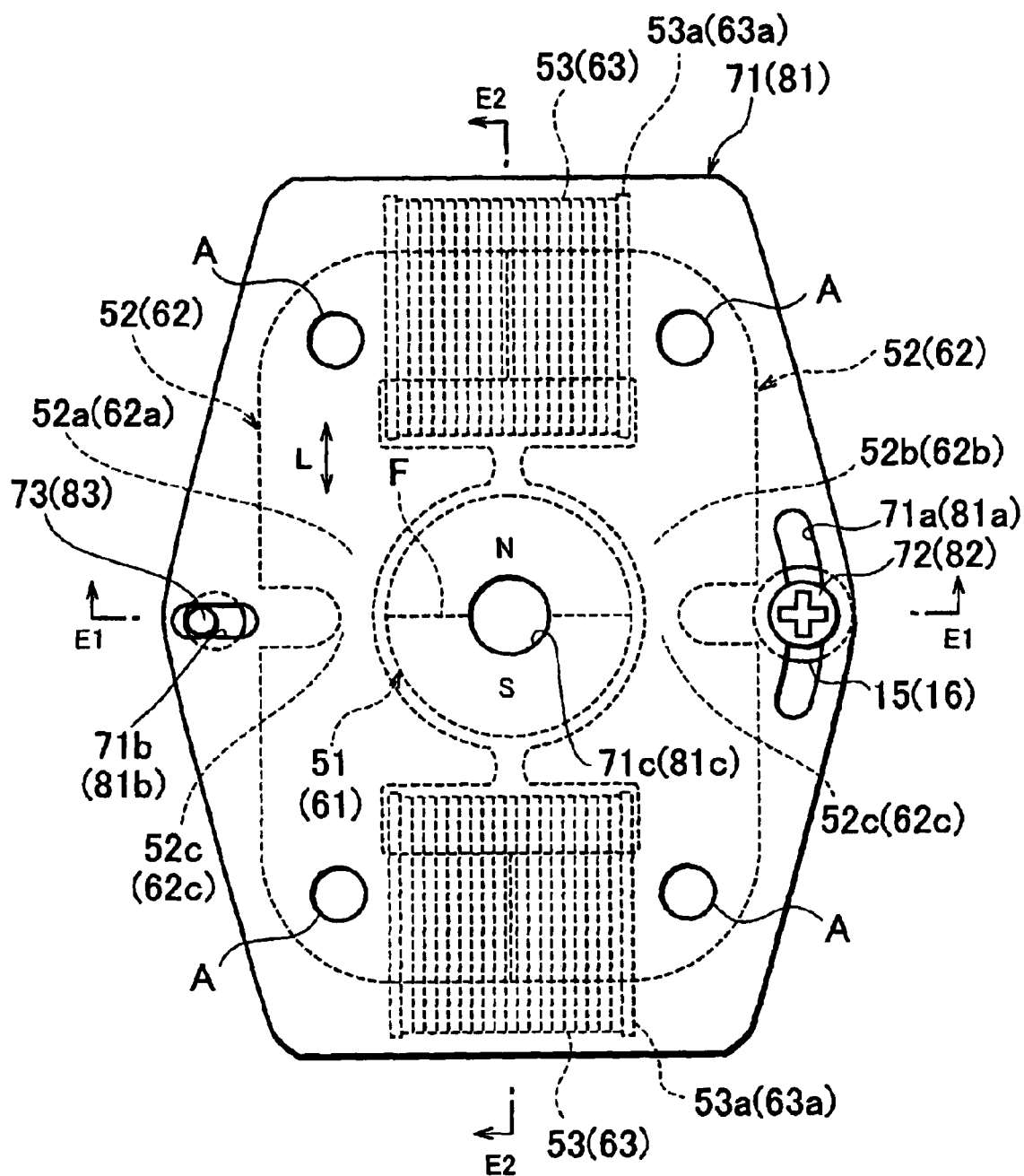
FIG. 2 is a plan view of the electromagnetic actuator.
Figure 3A:
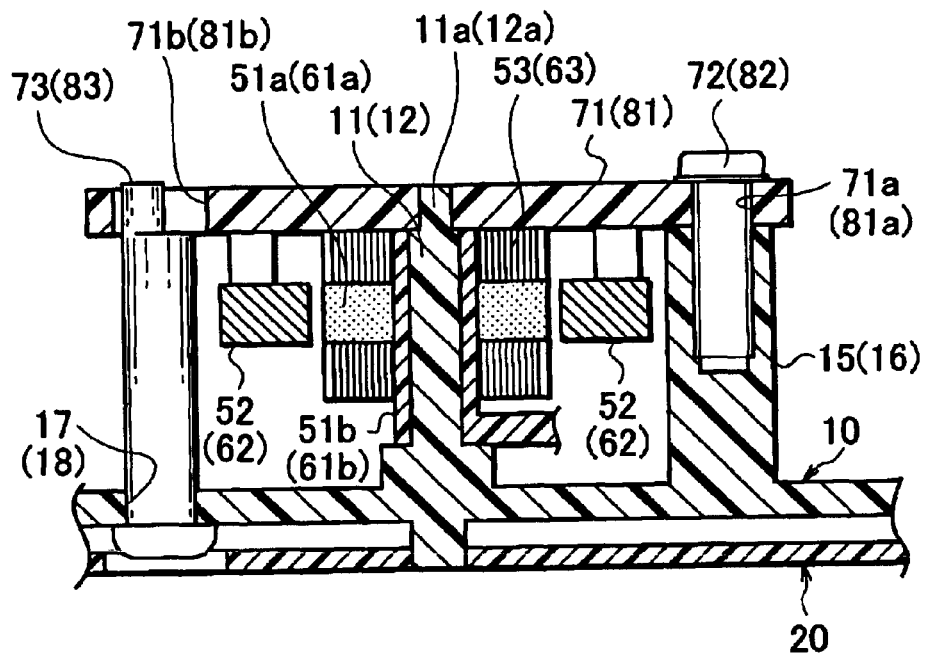
FIG. 3A is a sectional view along line E1—E1 shown in FIG. 2.
Figure 3B:
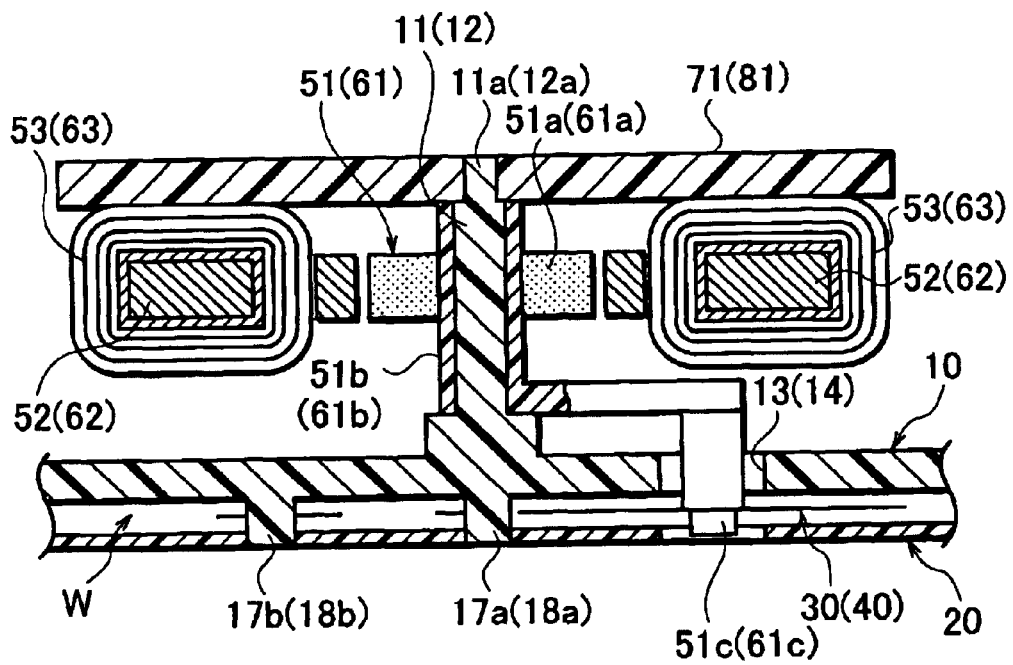
FIG. 3B is a sectional view along line E2—E2 shown in FIG. 2.

As shown in FIG. 1 and FIG. 2, the rotor 51 (61) includes a cylindrical magnetized part 51a (61a) magnetized to different polarities (N pole and S pole) with a boundary plane F therebetween, a cylindrical supported part 51b (61b) that holds the magnetized part 51a (61a) and that is outer-fitted to the supporting shaft 11 (12), and the driving pin 51c (61c) that deformedly protrudes from the lower end of the supported part 51b (61b) and that serves as an output part.

The yoke 52 (62) is extended in the direction of arrow "L" as shown in FIG. 1 and FIG. 2 and is formed by connecting two flat plate-like yokes shaped substantially like "E" together in the area of the coil 53 (63). The yoke 52 (62) includes magnetic-pole parts 52a and 52b (62a, 62b) facing the outer peripheral surface of the rotor 51 (61) in an almost central area thereof, and a constricted part 62c (52c) formed substantially at the center of each of the magnetic-pole parts 52a and 52b (62a, 62b). In the constricted part 52c (62c), a sectional area used as a magnetic path is reduced more than the other parts so that a magnetic flux cannot easily pass through.

The coil 53 (63) is wound onto a bobbin 53a (63a) as shown in FIG. 1. The two bobbins 53a (63a) hold the right-hand and left-hand plate-like yokes while fitting and joining the yokes together.

As shown in FIG. 1 and FIG. 2, the yoke 52 (62) is held while being firmly fixed to the substantially rectangular holding plate 71 (81) with an adhesive, a screw, or the like, in area "A," for example. Without being limited to area "A," other areas may be used as the area for the fixation. Additionally, the yoke 52 (62) may have a projection that is fixed to the holding plate 71 (81) with an adhesive or a screw.

The holding plate 71 (81) has a circularly arcuate long hole 71a (81a), a linear long hole 71b (81b), and a circular hole 71c (81c) into which the tip 11a (12a) of the supporting shaft 11 (12) is inserted. A screw 72 (82) to be screwed to the screw portion 15 (16) of the main plate 10 is inserted into the long hole 71a (81a). On the other hand, an eccentric pin 73 (83) rotatably supported by the supporting hole 17 (18) of the main plate 10 is inserted into the long hole 71b (81b).

That is, the rotor 51 (61) (supported part 51b (61b)) is outer-fitted onto the supporting shaft 11 (12) so as to be rotatably supported, the holding plate 71 (81) holding the yoke 52 (62) is then attached from above such that the tip 11a (12a) of the supporting shaft 11 (12) is inserted into the circular hole 71c (81c), and the eccentric pin 73 (83) is inserted into the long hole 71b (81b), the screw 72 (82) is then inserted into the long hole 71a (81a) and is screwed to the screw portion 15 (16), and whereby the holding plate 71 (81) is fixed to the main plate 10.

Although the magnetic-pole parts 52a and 52b (62a, 62b) of the yoke 52 (62) face the magnetized part 51a (61a) of the rotor 51 (61) when attached, the eccentric pin 73 (83) is appropriately rotated so as to face predetermined areas of the N and S poles, i.e., so as to situate the boundary plane F at a predetermined angular position in a rest position, and the holding plate 71 (81) is rotated on the rotational axis of the rotor 51 (61). Thus, the mounting angle is adjusted, and, after finishing the adjustment, the screw 72 (82) is tightened to the screw portion 15 (16).

An angle adjusting mechanism 70 (80) capable of adjusting a relative mounting angle between the rotor 51 (61) (and the driving pin 51c (61c)) and the yoke 52 (62) is made up of the holding plate 71 (81), which holds the yoke 52 (62), and an adjusting mechanism, which is made up of the circularly arcuate long hole 71a (81a), the linear long hole 71b (81b), the screw 72 (82), and the eccentric pin 73 (83) that are used to position the holding plate 71 (81) at a desired angular position around the rotational axis of the rotor 51 (61).

According to the angle adjusting mechanism 70 (80), the boundary plane F of the magnetized part 51a (61a) will deviate from a predetermined position with respect to the yoke 52 (62) if the magnetization angle of the rotor 51 (61) is caused to deviate from a predetermined position, for example. Therefore, the boundary plane F can be situated at the predetermined position by allowing the angle adjusting mechanism 70 (80) to rotate the holding plate 71 (81) and by adjusting (correcting) the angular position of the yoke 52 (62).

Figure 4:
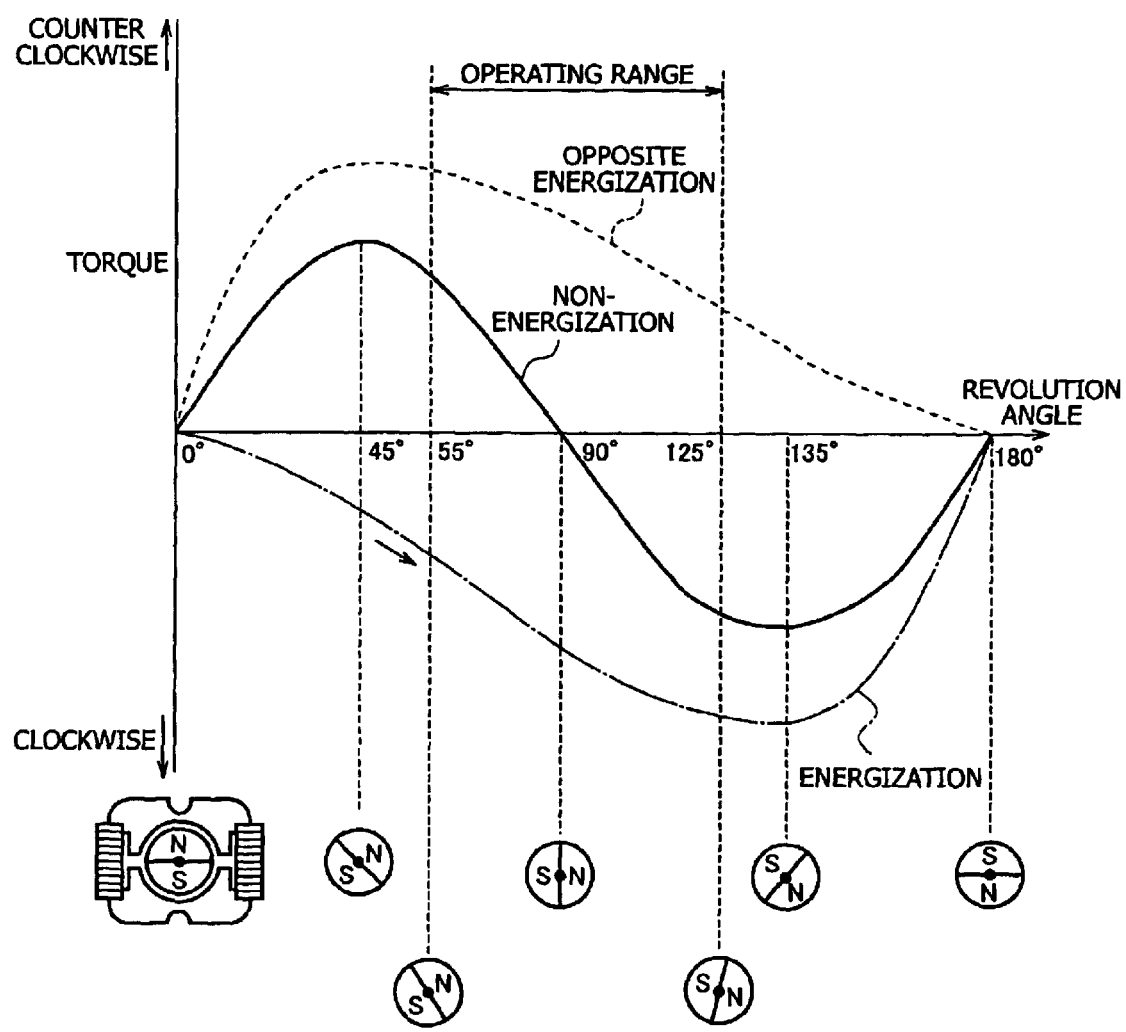
FIG. 4 shows characteristics of a driving torque of the electromagnetic actuator.

Referring now to FIG. 2 and FIG. 4, a description will be given of the relationship between a driving torque and the angular position of the rotor 51 (61) with respect to the yoke 52 (62). If the position (i.e., position shown in FIG. 2) where the boundary plane F of the magnetized part 51a (61a) is aligned with the constricted part 51c (61c) is assumed as a reference position (0 degrees), a driving torque generated by the rotor 51 (61) can be expressed as a sine curve in which zero (0) appears at this reference position and positions having intervals of a rotational angle of 90 degrees.

Furthermore, let it be assumed that the operating range (i.e., rotational angular range) of the rotor 51 (61) falls within, for example, 55 to 125 degrees from the reference position (i.e., an operating angle of 70 degrees).

If the rotor 51 is formed in a state where the angular position between the boundary plane F of the magnetized part 51a (61a) and the driving pin 51c (61c) deviates from a predetermined position because of, for example, variation in the magnetization angle under this condition, attachment will be performed in a state where the boundary plane F deviates from the predetermined position of the yoke 52 (62), because the driving pin 51c (61c) is restricted by the edge of the guide slot 13 (14).

Therefore, the position of the rotor 51 (61) and the position of the yoke 52 (62) can be corrected to be situated at a predetermined angular position by allowing the angle adjusting mechanism 70 (80) to adjust the mounting angle of the holding plate 71 (81) and by relatively changing the position of the yoke 52 (62). Additionally, a desired torque characteristic and a desired exposure characteristic can be obtained by appropriately adjusting the mounting angle of the holding plate 71 (81) in the same way when there is a need to obtain the desired exposure characteristic (according to the slit running of the leading blades 30 and the trailing blades 40, for example) by changing the torque characteristic of the rotor 51 (61).

Referring now to FIG. 4, FIG. 5, and FIG. 6, a description will be given of the operation of the focal plane shutter in a case in which the focal plane shutter having the angle adjusting mechanisms 70 and 80 is carried on a silver salt film type camera.

First, when a photography standby state is reached by turning on a main switch of the camera, the leading blade 30 is at the closed position, and the trailing blade 40 is at the open position as shown in FIG. 5. At this moment, the driving pins 51c and 61c of the electromagnetic actuators 50 and 60 are in a current-stopped state and are situated at the upper edges of the guide slots 13 and 14, respectively. The leading blade 30 is kept at the closed position, and the trailing blade 40 is kept at the open position by the counterclockwise magnetic urging force generated by the rotors 51 and 61.

When a photographer performs a releasing operation in this standby state, an electric current is first passed through the electromagnetic actuator 50, and the rotor 51 generates a clockwise rotational driving force. Thereafter, an electric current is passed through the electromagnetic actuator 60, and the rotor 61 generates a clockwise rotational driving force.

In response thereto, the leading blade 30 starts an opening operation, and, after a predetermined interval, the trailing blade 40 starts a closing operation. Accordingly, an exposure operation is performed by slit running of the leading blades 30 and the trailing blades 40.

Figure 7:
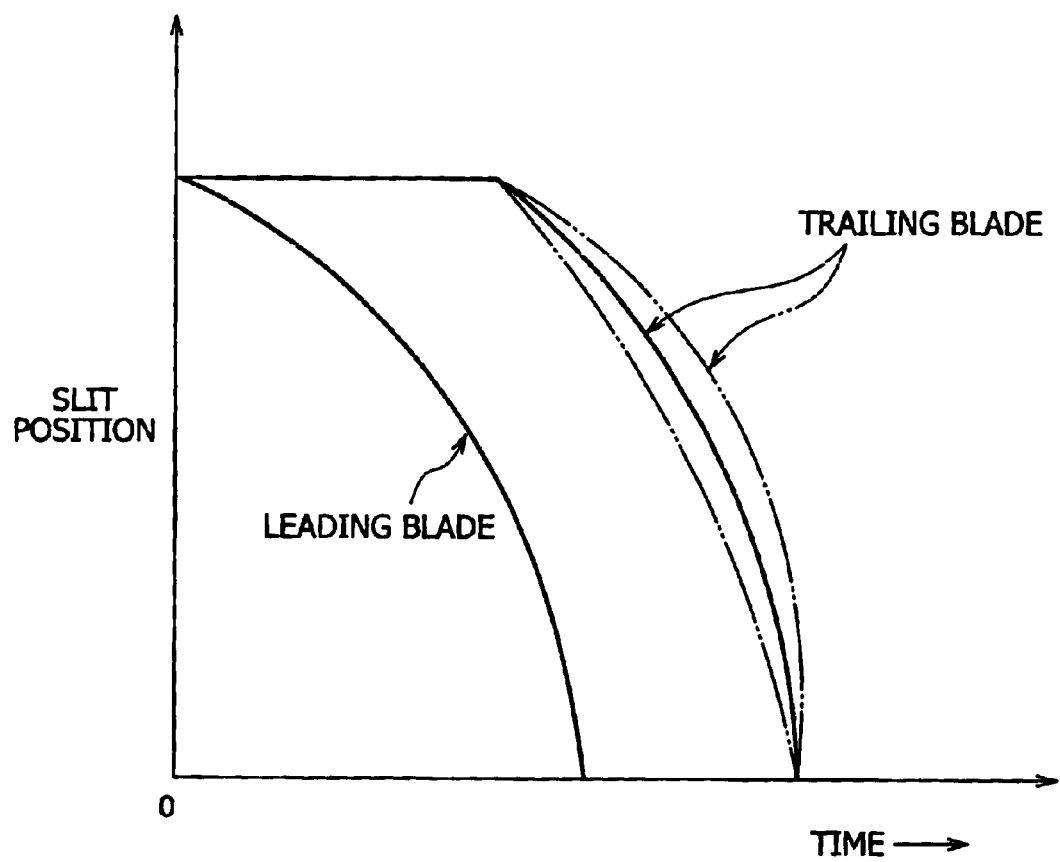
FIG. 7 shows running characteristics of the leading and trailing blades.

If the trailing blade 40 has a running characteristic shown by the alternate long and two short dashed lines of, for example, FIG. 7 herein, a running characteristic shown by the solid line of the figure can be obtained by allowing the angle adjusting mechanism 80 to adjust the positional relationship between the rotor 61 (magnetized part 61a) and the yoke 62 and by changing the torque characteristic within the operating range.

As a result, the slit running of the leading blades 30 and the trailing blades 40 each as shown by the solid line can be obtained, i.e., a desired stable exposure operation can be obtained. The exposure operation is performed according to the opening operation of the leading blade 30 and according to the closing operation of the trailing blade 40 as described above, and a photography is completed.

The driving pins 51c and 61c of the electromagnetic actuators 50 and 60 are at the lower edges of the guide slots 13 and 14, respectively, as shown in FIG. 6 when the exposure operation is finished. If the energization is stopped in this state, the rotors 51 and 61 generate a clockwise magnetic urging force, so that the leading blade 30 is kept at the open position, and the trailing blade 40 is kept at the closed position.

Thereafter, when an electric current is passed through the electromagnetic actuators 50 and 60 in the opposite direction, both of the rotors 51 and 61 rotate counterclockwise and return to the first standby position where the leading blade 30 is at the closed position, and the trailing blade 40 is at the open position as shown in FIG. 5.

When the energization is stopped, the leading blade 30 and the trailing blade 40 are kept in that state by a counterclockwise magnetic urging force generated by the rotors 51 and 61. In the subsequent photographic processes, the aforementioned sequence is repeated.

FIG. 8 through FIG. 10C show another embodiment of a focal plane shutter according to the present invention. Except that the angle adjusting mechanisms 70 and 80 are changed (i.e., the structure of each of the electromagnetic actuators 50 and 60 is partially modified), this embodiment is identical to the aforementioned embodiment. Therefore, the same reference characters are given to the same constituent elements as in the aforementioned embodiment, and a description thereof is omitted.

As shown in FIG. 8 through FIG. 10C, this focal plane shutter includes a main plate 10' and a back plate 20 that define the apertures 10a and 20a, a leading blade 30 and a trailing blade 40 pivotably supported on the main plate 10' so as to open and close the apertures 10a and 20a, an electromagnetic actuator 50' that is disposed at the lower left side of the aperture 10a and that directly drives the leading blade 30, an electromagnetic actuator 60' that is disposed at the upper left side of the aperture 10a in parallel with the electromagnetic actuator 50' and that directly drives the trailing blade 40, and an angle adjusting mechanism that adjusts the mounting angle of each of the electromagnetic actuators 50' and 60'.

As shown in FIG. 8 through FIG. 10C, the electromagnetic actuator 50' (60') is made up of a rotor 51' (61') that is rotatably supported by the supporting shaft 11 (12) of the mainplate 10' and that rotates within a predetermined angular range, a flat yoke 52 (62) that is disposed around the rotor 51' (61') and that forms a magnetic circuit, and two magnetizing coils 53 (63) wound onto the yoke 52 (62).

Figure 8:
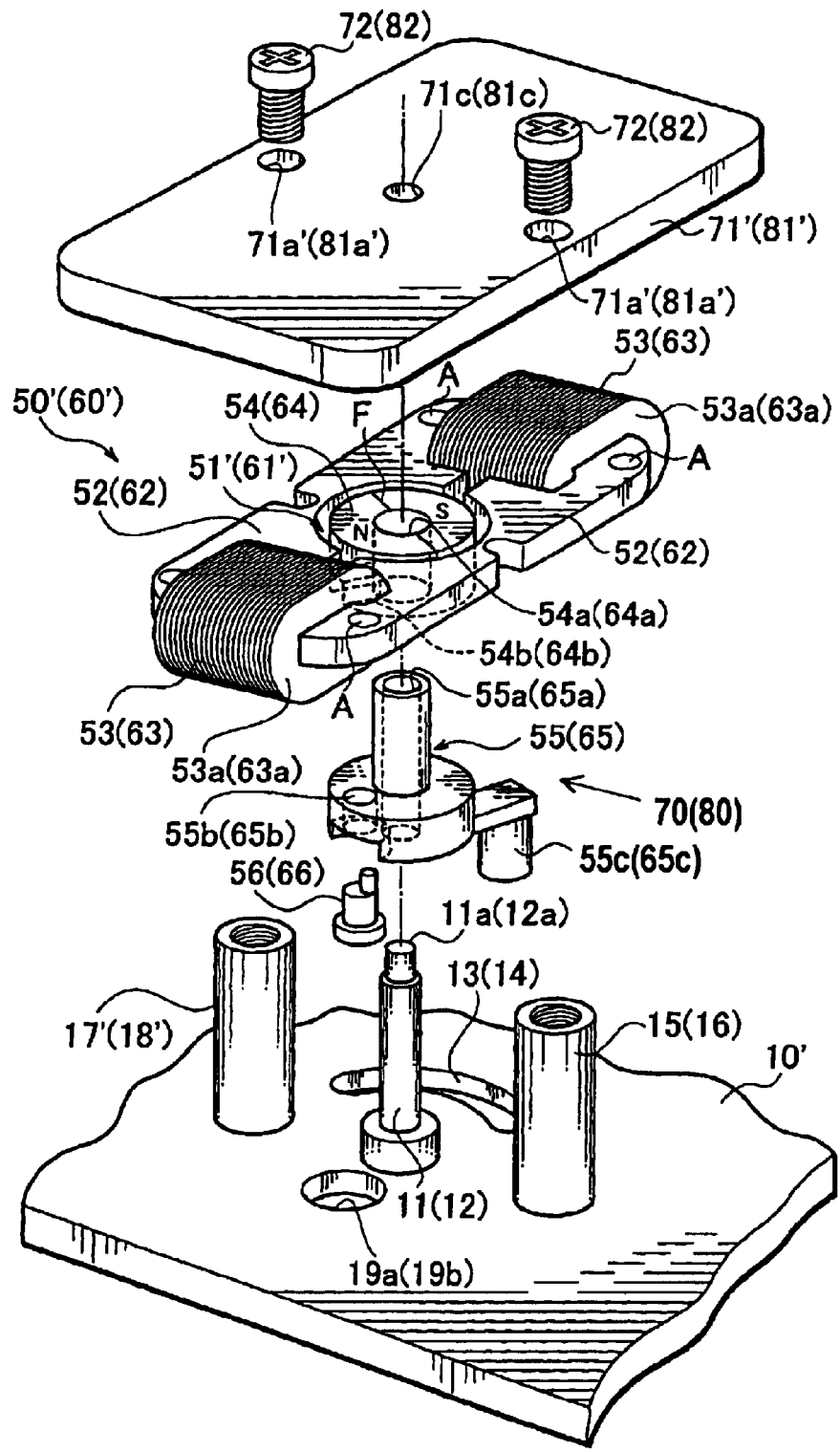
FIG. 8 shows another embodiment of a focal plane shutter according to the present invention, being an exploded perspective view of an electromagnetic actuator which is a constituent element of the focal plane shutter.
Figure 9:
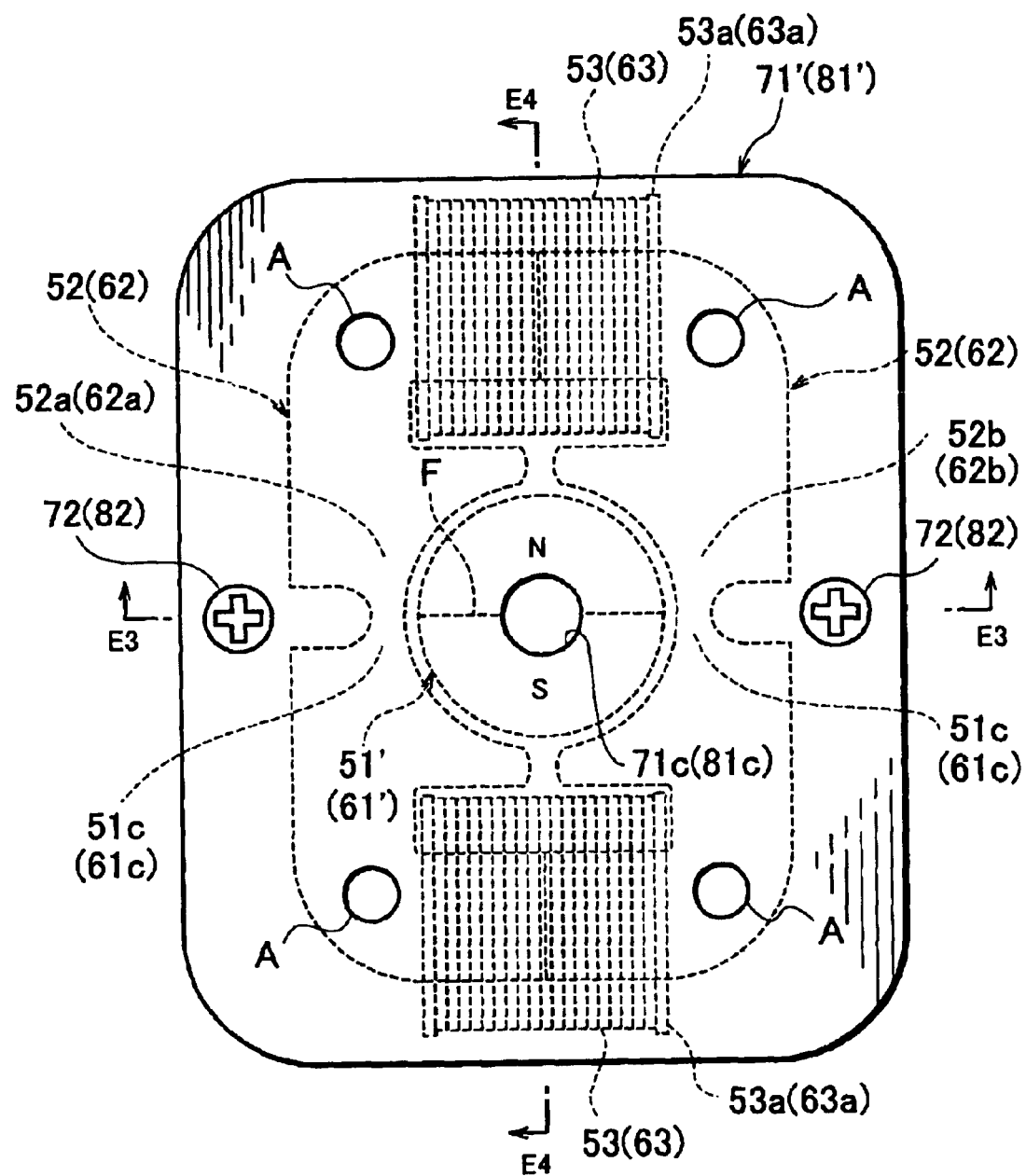
FIG. 9 is a plan view of the electromagnetic actuator shown in FIG. 8.
Figure 10A:
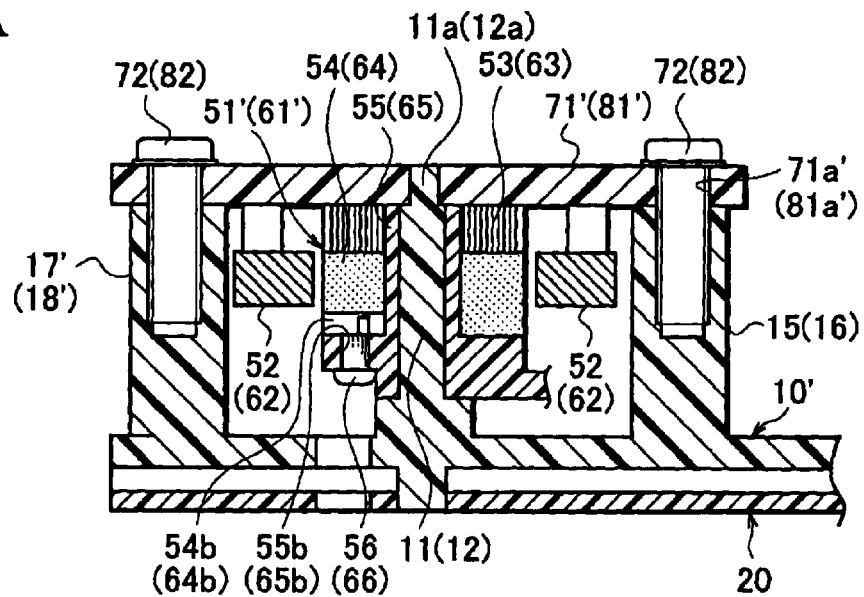
FIG. 10A is a sectional view along line E3—E3 shown in FIG. 9.
Figure 10B:
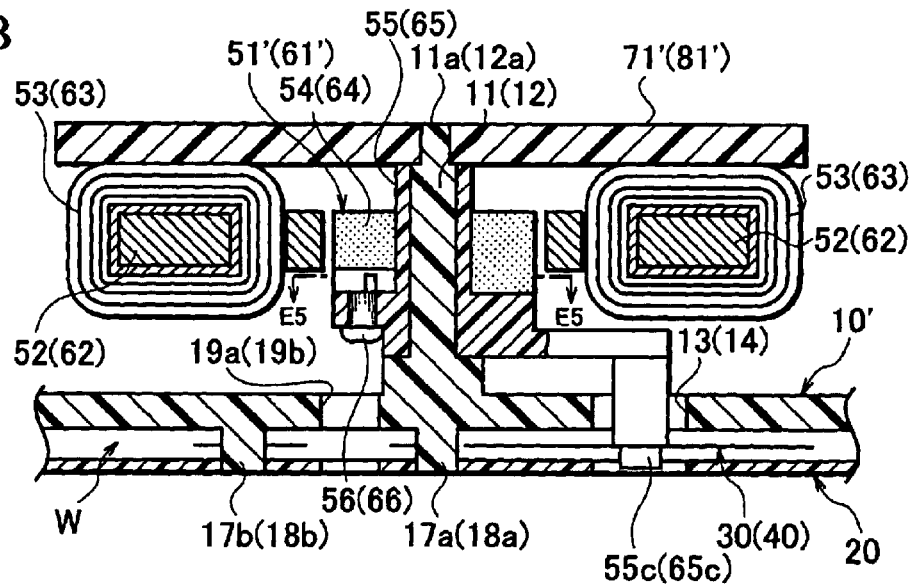
FIG. 10B is a sectional view along line E4—E4 shown in FIG. 9.
Figure 10C:
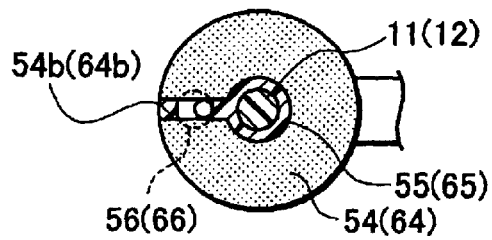
FIG. 10C is a sectional view along line E5—E5 shown in FIG. 10B.

As shown in FIG. 8 and FIG. 10A, the rotor 51' (61') is made up of a cylindrical magnetized part 54 (64) magnetized to N and S poles with the boundary plane F therebetween, and a supported part 55 (65) that is formed separately from the magnetized part 54 (64) and that is connected thereto.

The magnetized part 54 (64) has a through-hole 54a (64a) formed in the center and a groove 54b (64b) cut in the undersurface in the radial direction. The supported part 55 (65) has a through-hole 55a (65a) through which the supporting shaft 11 (12) passes, a circular hole 55b (65b) with a counterbore to which an eccentric pin 56 (66) is attached, and a driving pin 55c (65c) serving as an output part.

The magnetized part 54 (64) is fitted to the supported part 55 (65) and is brought into a slightly tight fitted state. Therefore, when the eccentric pin 56 (66) is appropriately rotated, the magnetized part 54 (64) is rotated to a predetermined angular position with respect to the supported part 55 (65) and is kept at the position obtained by the adjustment.

A structure may be employed in which the magnetized part 54 (64) is rotatably fitted to the supported part 55 (65). The relative angular position between the two parts is then adjusted by the eccentric pin 56 (66), and these are tightened and fastened with a screw (not shown) or the like.

As shown in FIG. 8 through FIG. 10C, the yoke 52 (62) is held while being firmly fixed to the substantially rectangular holding plate 71' (81') with an adhesive, a screw, or the like, in area "A," for example. Without being limited to area "A," other areas may be used as the area for the fixation. Additionally, the yoke 52 (62) may have a projection that is fixed to the holding plate 71' (81') with an adhesive or a screw.

The holding plate 71' (81') has a circular hole 71a' (81a') through which the screw 72 (82) passes and a circular hole 71c (81c) into which the tip 11a (12a) of the supporting shaft 11 (12) is inserted.

That is, the rotor 51' (61') (supported part 55 (65)) is fitted onto the supporting shaft 11 (12) so as to be rotatably supported, the holding plate 71' (81') holding the yoke 52 (62) is then attached from above such that the tip 11a (12a) of the supporting shaft 11 (12) is inserted into the circular hole 71c (81c). The screw 72 (82) is then inserted into the circular hole 71a' (81a') and is screwed to the screw portion 15 and 17' (16, 18'), and whereby the holding plate 71' (81') is fixed to the main plate 10'.

Although the magnetic-pole parts 52a and 52b (62a, 62b) of the yoke 52 (62) face the magnetized part 54 (64) of the rotor 51' (61') when attached, the eccentric pin 56 (66) is appropriately rotated through the through-hole 19a (19b) of the main plate 10' so as to face predetermined areas of the N and S poles (i.e., so as to situate the boundary plane F at a predetermined angular position in a rest position), and the magnetized part 54 (64) is rotated on the rotational axis with respect to the supported part 55 (65). Thus, the relative mounting angle therebetween is adjusted.

An angle adjusting mechanism capable of adjusting a relative mounting angle between the rotor 51' (61') (and the yoke 52 (62)) and the driving pin 55c (65c) is made up of the supported part 55 (65) that is formed separately from the magnetized part 54 (64) and that has the driving pin 55c (65c) and the adjusting mechanism made up of the groove 54b (64b) of the magnetized part 54 (64) and the eccentric pin 56 (66).

According to this angle adjusting mechanism, the boundary plane F of the magnetized part 54 (64) will deviate from a predetermined position with respect to the yoke 52 (62), for example, if the magnetization angle of the rotor 51' (61') deviates from a predetermined position when formed. Therefore, the angular position of the magnetized part 54 (64) with respect to the yoke 52 (62) can be adjusted (corrected), and the boundary plane F can be situated at the predetermined position by allowing the angle adjusting mechanism to adjust the angular position of the magnetized part 54 (64) with respect to the driving pin 55c (65c).

In the aforementioned embodiment, an example has been described in which the angle adjusting mechanisms 70 and 80 are employed in the structure having the electromagnetic actuators 50 and 60 and the leading blades 30 and the trailing blades 40 to open and close the aperture 10a. However, without being limited to this, the angle adjusting mechanism according to the present invention may be employed in a structure having a pair of blades and a single electromagnetic actuator.

As described above, according to the focal plane shutter of the present invention, in a structure having an electromagnetic actuator including a rotor that is rotatably supported on a base plate by which an exposure aperture is defined and that has a magnetized part and an output part, a yoke disposed around the rotor, etc., and exposure-aperture opening/closing blades that are supported pivotably on the base plate and that are connected to the output part, there is provided an angle adjusting mechanism capable of adjusting a relative mounting angle between at least two of the yoke, the magnetized part, and the output part of the rotor. Therefore, a relative mounting angle between at least two of the yoke, the magnetized part, and the output part of the rotor can be adjusted by this angle adjusting mechanism.

Therefore, if the magnetization angle (i.e., angular position of the boundary plane between N and S poles) of the rotor with respect to the yoke or the output part deviates from a predetermined position, variation in the magnetization angle can be corrected. Additionally, when there is a need to adjust the magnetization angle to take a desired angular position in order to change an exposure characteristic, the mounting angle can be appropriately changed.

What is claimed is:

1. A focal plane shutter comprising:
a base plate having an exposure aperture;
an electromagnetic actuator including:
  a rotor rotatably supported on said base plate, said rotor having a magnetized part magnetized to different polarities and an output part for outwardly outputting a driving force, said output part being separate from said magnetized part;
  a yoke around said rotor so as to form a magnetic circuit; and
  a magnetizing coil wound onto said yoke;
a blade pivotably supported on said base plate and connected to said output part of said rotor so as to be operable to open and close said exposure aperture; and
an angle adjusting mechanism capable of adjusting a relative mounting angle between at least two of said yoke, said magnetized part of said rotor, and said output part of said rotor around a rotational axis of said rotor, said angle adjusting mechanism including said output part and an adjusting mechanism capable of adjusting a relative angular position between said rotor and said output part.

2. The focal plane shutter as set forth in claim 1, wherein said angle adjusting mechanism includes a holding plate for holding said yoke and an adjusting mechanism capable of adjusting said holding plate to a desired angular position around the rotational axis.

3. The focal plane shutter as set forth in claim 1, wherein:
said blade comprises a leading blade for opening said exposure aperture and a trailing blade for closing said exposure aperture in an exposure operation, and
said electromagnetic actuator and said angle adjusting mechanism are provided for each of said leading blade and said trailing blade.

4. The focal plane shutter as set forth in claim 2, wherein:
said blade comprises a leading blade for opening said exposure aperture and a trailing blade for closing said exposure aperture in an exposure operation, and
said electromagnetic actuator and said angle adjusting mechanism are provided for each of said leading blade and said trailing blade.

5. The focal plane shutter as set forth in claim 1, wherein
said blade comprises a leading blade for opening said exposure aperture and a trailing blade for closing said exposure aperture in an exposure operation, and
said electromagnetic actuator and said angle adjusting mechanism are provided for each of said leading blade and said trailing blade.

* * * * *